United States Patent [19]
Quandt

[11] Patent Number: 5,988,699
[45] Date of Patent: Nov. 23, 1999

[54] TANK FITTING FACILITATING FLUID DRAINAGE

[75] Inventor: Erik T. Quandt, Brownsburg, Ind.

[73] Assignee: Banjo Corporation, Crawfordsville, Ind.

[21] Appl. No.: 09/010,404

[22] Filed: Jan. 21, 1998

Related U.S. Application Data

[60] Provisional application No. 60/035,994, Jan. 22, 1997.

[51] Int. Cl.⁶ ..................................... F16L 35/00
[52] U.S. Cl. .................... 285/142.1; 285/205; 29/428; 29/890.14
[58] Field of Search ..................... 285/205, 363, 285/368, 405, 412, 136.1, 139.1, 139.2, 139.3, 141.1, 142.1; 29/428, 890.14

[56] References Cited

U.S. PATENT DOCUMENTS

| | | | |
|---|---|---|---|
| 2,441,009 | 5/1948 | Cunningham | 285/205 X |
| 2,675,252 | 4/1954 | Haines | 285/205 X |
| 2,757,025 | 7/1956 | Noyes et al. | 285/205 X |
| 2,922,526 | 1/1960 | Ohmann | 285/205 X |
| 4,593,714 | 6/1986 | Madden | 285/205 X |
| 5,690,368 | 11/1997 | Johnson | 285/205 X |

OTHER PUBLICATIONS

Product brochure entitled Banjo Liquid Handling Products, A New Generation of Products!, Banjo Corporation, Crawfordsville, IN, Sep. 1995, particularly p. 18 & back cover.
Product brochure entitled Snyder Agricultural Tanks—Built for a Life on the Farm, Snyder Industries, Inc., Lincoln, NE, particularly p. 12.
Product brochure entitled Agricultural Product Directory Products & Accessories, Raven Industries, Inc., Plastics Division, Sioux Falls, SD, particularly pp. C3, C5, & C7.
Product brochure entitled Agricultural Tanks, Raven Industries, Plastics Division, Sioux Falls, SD, particularly p. 5.
Product brochure entitled Controlling Corrosive Liquids Through Plastics, Hayward Industrial Products, Inc., Elizabeth, NJ, Mar. 1987, particularly p. 21.
Product brochure entitled Perfection by Design, Norwesco Inc., Fluid Systems Division, St. Bonifacius, MN, 1989, particularly p. 10.
Tank fitting, photographs marked as Fig. 1 and Fig. 2.

*Primary Examiner*—Dave W. Arola
*Attorney, Agent, or Firm*—Baker & Daniels

[57] ABSTRACT

A tank fitting assembly for an inlet/outlet port in a tank wall. The tank fitting assembly includes first and second fitting elements which are respectively mountable to an interior surface and an exterior surface of a tank and in registry with a drain opening in the tank wall. Stand-offs furnished on the underside of the body of the first fitting element create a gap between the underside of the element body and the tank wall. The gap serves as a fluid passageway, thereby allowing fluid to empty from the tank by passing along the bottom wall of the tank to the tank wall drain opening and then through a drain hole in the second fitting element. The connectors used to connect together the first and second fitting elements extend through bores provided in the first fitting element, through the tank wall, and through bores provided in the second fitting element. Plugs mountable to the heads of the connectors fit within cavities in the first fitting element in which the connector heads reside when installed, and the plugs provide fluid tight seals with the first fitting element to prevent fluid in the tank from reaching the connector heads. A method of providing a tank with a tank fitting assembly is also disclosed.

20 Claims, 11 Drawing Sheets

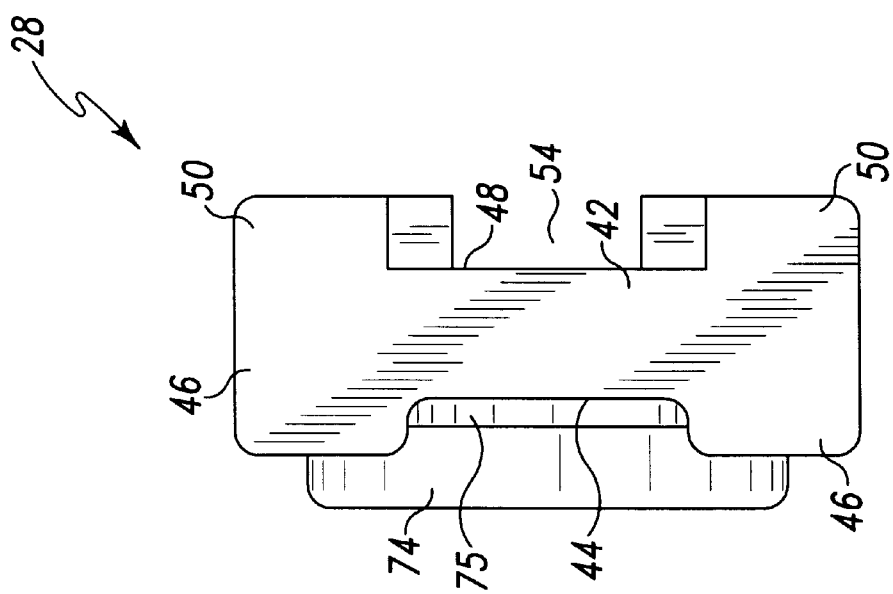
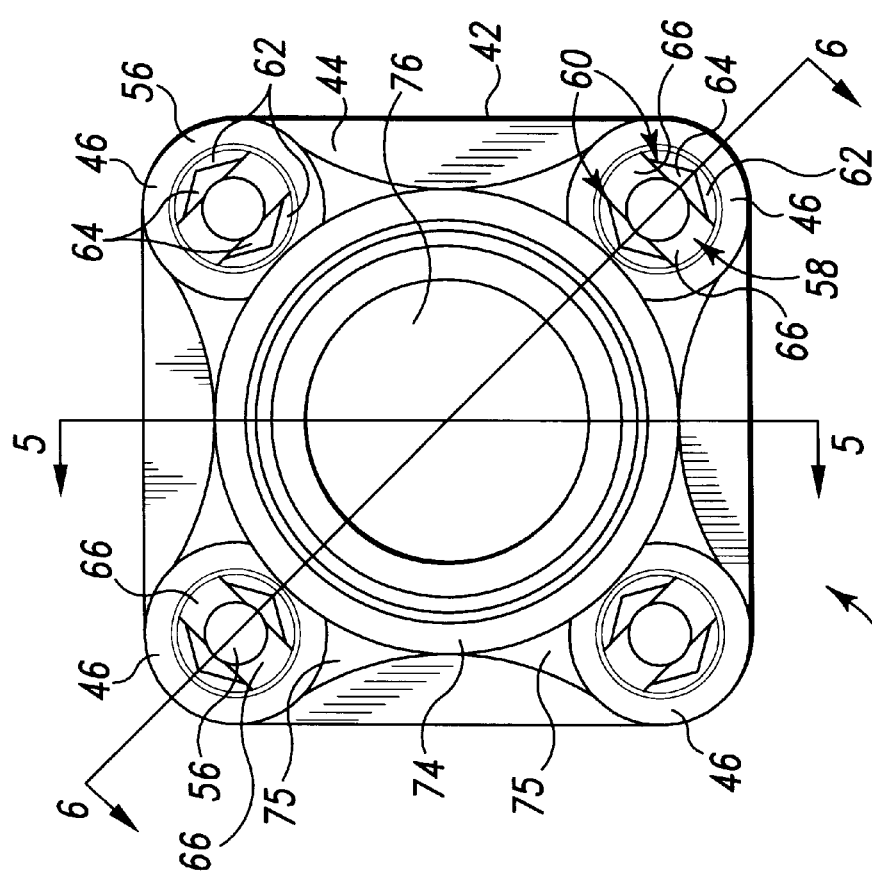
Fig. 3
Fig. 2

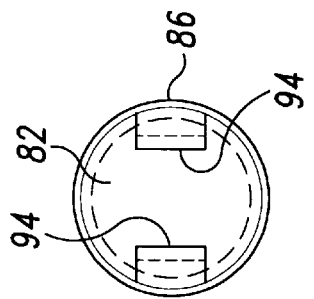
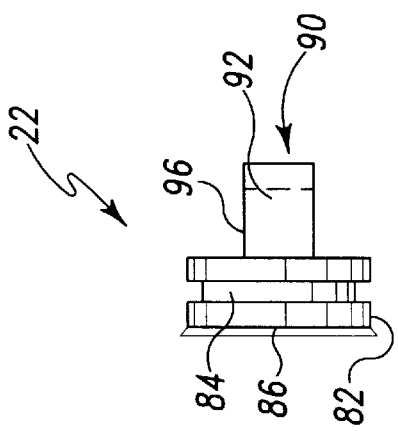
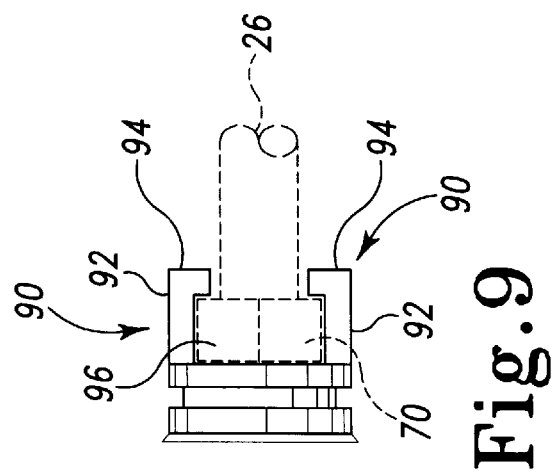

5,988,699

TANK FITTING FACILITATING FLUID DRAINAGE

CROSS-REFERENCE TO RELATED APPLICATION

This application claims the benefit under 35 U.S.C. § 119(e) of U.S. Provisional Application Ser. No. 60/035,994, filed Jan. 22, 1997.

BACKGROUND OF THE INVENTION

The present invention pertains to tank fittings, and, in particular, to a tank fitting utilized to provide a tank or vessel with an inlet/outlet port.

Tanks are utilized to transport and hold a variety of fluids. Tanks made of plastic frequently are either roto-molded or blow molded, and during each of these fabrication processes, molding openings into the tank is problematic. In order to provide a drain outlet in such tanks, typically a hole is drilled through the plastic tank body and a fitting is secured over the tank hole. To maximize the amount of fluid within the tank which can be drained by gravity, and if possible, such fittings are provided on the tank bottom wall rather than a tank side wall.

One problem with existing fitting designs results from the need to mount within the volume of the tank a back plate fitting part for connection to an externally accessible portion of the fitting. The use of conventional back plates limits the amount of fluid that can be drained from the tank. In particular, in order to drain from the tank, fluid must pass over the top edge of the back plate, through the back plate's central opening aligned over the hole in the tank wall, and then out through the external portion of the fitting. Consequently, any fluid in the tank at a height below the top edge of the back plate remains in the tank after drainage. An attempt to address this problem includes a low profile back plate fitting portion, but a better solution is desired as fluid still remains within the tank with such a design.

Another problem with many tank fittings results from the corrosive nature of the contents of the tanks. Frequently, the tank fittings are made of an inert material which does not react with the tank contents. However, stainless steel bolts, which simplify the interconnection of the back plate fitting portion with the external portion of the fitting, may react with the tank contents. To address this problem, threaded studs that are not exposed within the tank have been utilized. However, besides being more expensive to manufacture than bolts, such studs increase the assembly time, and therefore the assembly costs, of the fittings in which they are employed.

Thus, it would be desirable to provide an apparatus which overcomes these and other shortcomings of the prior art.

SUMMARY OF THE INVENTION

The present invention provides a tank fitting assembly with stand-offs along the underside of a back plate fitting part mountable within a tank. The stand-offs space the back plate fitting part from the tank wall to furnish passageways between the tank bottom wall and the back plate fitting part through which fluid drains from the tank. The present invention also provides sealing plugs attachable to bolt heads used to secure the components of the tank fitting assembly together. The plugs protect the bolts by preventing potentially corrosive liquids in the tank from contacting the bolt heads.

In one form thereof, the present invention provides a tank fitting assembly for a tank including a drain opening in a bottom wall. The tank fitting assembly includes a first fitting element mountable to an interior surface of the tank bottom wall in registry with the drain opening, a second fitting element mountable to an exterior surface of the tank bottom wall in registry with the drain opening, and a plurality of connectors. The first fitting element includes a first bottom surface portion and a second bottom surface portion that is upwardly offset from the first bottom surface portion. The second bottom surface portion is structured and arranged to be in a direct facing and spaced apart relationship with the tank bottom wall, whereby the second bottom surface portion defines with the tank bottom wall at least one fluid passageway for fluid to pass along the bottom wall of the tank between a location lateral to the first fitting element and the tank wall drain opening. The second fitting element includes a drain hole adapted to provide flow communication between the tank wall drain opening and a location external to the tank. The connectors are extendable through the tank bottom wall for interconnecting the first and second fitting elements.

In another form thereof, the present invention provides a tank fitting assembly for a tank including a wall defining a fluid fillable internal volume, wherein a section of the wall defining a region of the internal volume includes a drain opening and at least one connector accommodating opening spaced from the drain opening. The tank fitting assembly includes a first fitting element internally mountable to the tank in registry with the tank wall drain opening, a second fitting element externally mountable to the tank in registry with the tank wall drain opening, a plurality of connectors, and a plurality of plugs. The first fitting element includes a bottom surface facing toward the wall section and a top surface facing away from the wall section. The first fitting element is structured and arranged to form a fluid passageway for flow communication between the tank wall drain opening and the tank internal volume. The first fitting element includes a plurality of bores disposed in a first arrangement and a plurality of cavities separate from the fluid passageway, and each of the plurality of bores includes an upper end portion that opens into a different one of the cavities. The second fitting element includes a drain hole adapted to provide flow communication between the tank wall drain opening and a location exterior to the tank. The second fitting element includes a plurality of bores disposed in the first arrangement. The connectors, which are insertable through the connector accommodating openings of the tank wall for interconnecting the first and second fitting elements, each includes an enlarged head and a shaft extending from the head. Each of the connector heads is structured to fit within one of the cavities and to not fit within the upper end portion of the bore of the first fitting element associated with the cavity. Each of the shafts extends within one of the bores of the first fitting element and one of the bores of the second fitting element. Each of the plugs is disposed within one of the cavities above the connector head within that cavity, and the plugs are adapted to provide fluid tight seals with the first fitting element to prevent fluid in the tank from reaching the connector heads.

In still another form thereof, the present invention provides a method of providing a fitting on a tank having a wall including a drain opening and at least one connector accommodating opening. The method includes the step of positioning a first fitting element on an inside surface of the tank in registry with the tank wall drain opening. The first fitting element includes a fluid passageway to permit flow communication between the tank wall drain opening and the tank internal volume, and a plurality of bores disposed in a first arrangement and a plurality of cavities separate from the fluid passageway, wherein each of these bores includes an end portion that opens into a different one of the cavities. The method also includes the steps of positioning a second fitting element on an outside surface of the tank in registry with the tank wall drain opening, wherein the second fitting element includes a plurality of bores disposed in the first arrangement and a drain hole adapted to provide flow communication between the tank wall drain opening and a location exterior to the tank, and connecting the first and second fitting elements with a plurality of bolts and nuts. The connecting step involves first installing each bolt such that its head resides within one of the cavities and its shaft extends through the bore of the first fitting element associated with that cavity, the connector accommodating opening, and one of the bores of the second fitting element, and then threading each nut onto the insertion end of its corresponding bolt. The method also includes the step of installing a plurality of plugs within the cavities above the bolt heads within the cavities, wherein the plugs are adapted to provide fluid tight seals with the first fitting element to prevent fluid in the tank from reaching the bolt heads.

One advantage of the present invention is that a tank fitting assembly is provided which when mounted to a bottom wall of a tank promotes a more complete drainage of that tank.

Another advantage of the present invention is that a tank fitting assembly is provided with sealing plugs that are attachable over the heads of bolts, thereby permitting standard type bolts to be utilized to connect together the components of the tank fitting assembly.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein:

FIG. 2 is a left end view, taken from the perspective of a FIG. 1 viewer, of the back plate of the tank fitting assembly of FIG. 1;

FIG. 3 is a side view of the back plate of FIG. 2;

FIG. 7 is a side view of the bolt protecting plug of the present invention with its associated sealing O-ring not shown;

FIG. 8 is a right end view of the plug of FIG. 7;

FIG. 9 is a top view of the plug of FIG. 7;

Figure 1:
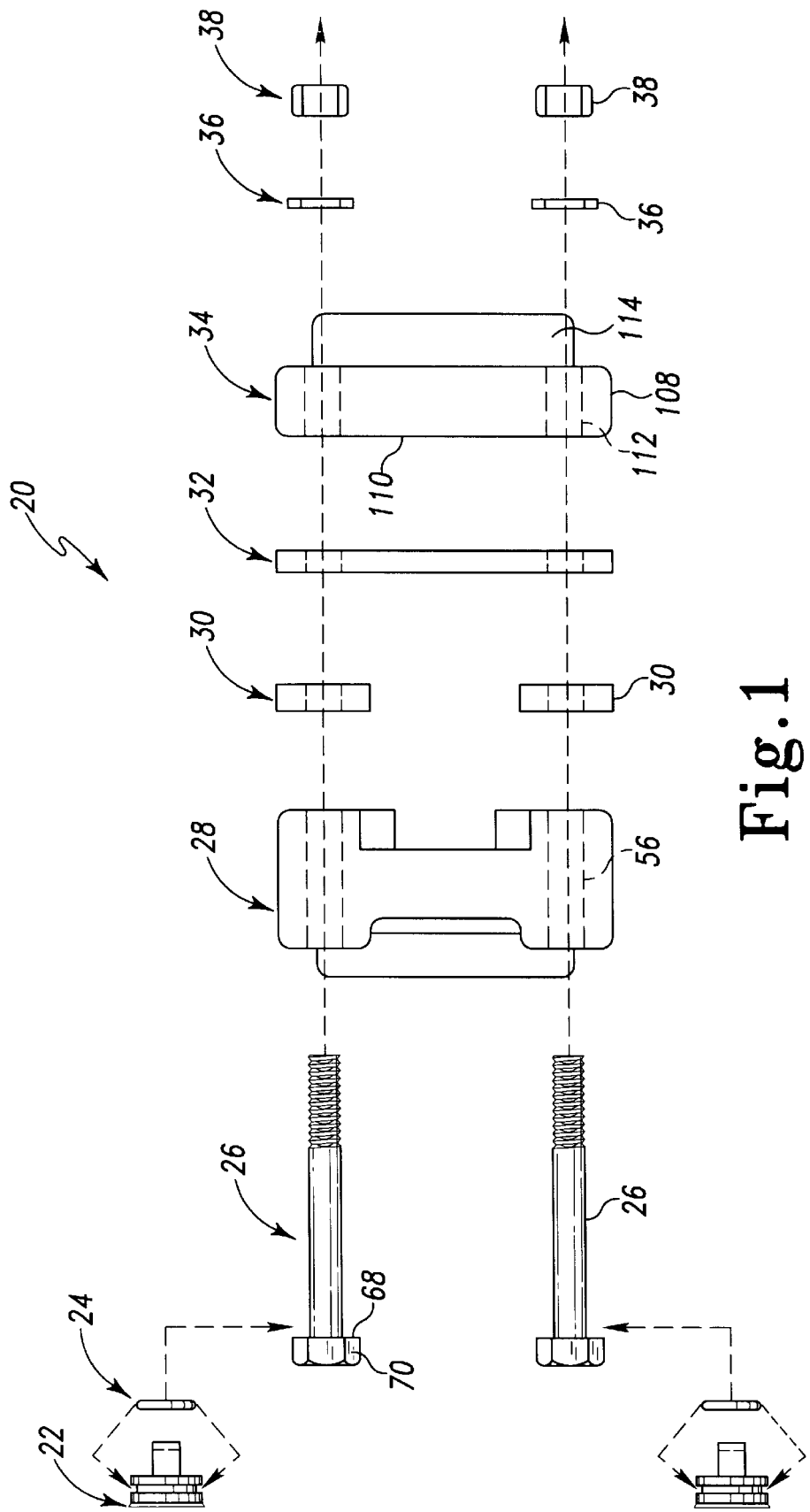
FIG. 1 is an exploded side view of one embodiment of a tank fitting assembly of the present invention.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

Referring now to FIG. 1, there is shown in an exploded form a first embodiment of a tank fitting assembly 20 of the present invention. Assembly 20 includes four bolted flange plugs 22 each equipped with an O-ring 24, four hex head bolts 26, one bolted flange back plate 28, four annular drain gaskets 30, one apertured flange gasket 32, one externally mountable tank flange 34, four lock washers 36 and four hex nuts 38. Plugs 22, back plate 28 and tank flange 34 are each fabricated from a twenty percent glass filled polypropylene, and such a material of construction is selected for its compatibility with many fluids. Other materials of construction, including metals, polyethylene, and FDA approved materials such as certain polypropylenes suitable for food use, may be substituted within the scope of the invention. O-ring 24 is made of a fluoroelastomer such as Viton® available from DuPont. Other suitable sealing materials, such as different elastomers or plastics with suitable chemical compatibility for the fluid being retained, may alternatively be employed for O-rings 24. Bolts 26, lock washers 36 and hex nuts 38 are made of an 18-8 grade of stainless steel or other strong and durable material. Drain gaskets 30 and flange gasket 32 are made of a cross-linked polyethylene foam or other suitable material that provides satisfactory fluid-tight sealing characteristics between the tank wall and the assembly components when sandwiched therebetween as described further below. For example, elastomers may be used for gaskets 30 and 32 but are a less economical solution in most applications.

Figure 5:
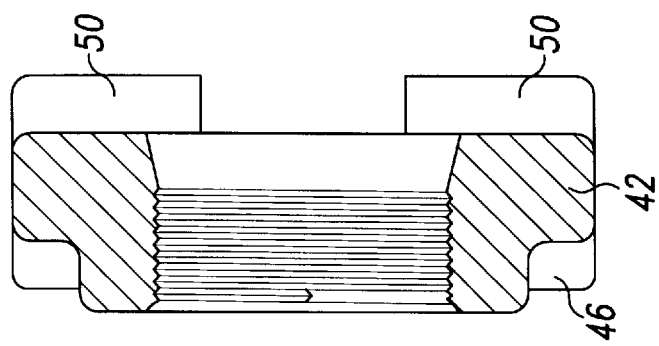
FIG. 5 is a cross-sectional view, conceptually taken along line 5—5 of FIG. 2, showing a back plate with a one and one-half inch National Pipe Thread (NPT) design rather than the two inch NPT thread design of FIG. 2.

Bolted flange back plate 28 is further shown in FIGS. 2–6. Due to the symmetry of back plate 28, the view shown in FIG. 3 is representative of the top, bottom and left and right side views of FIG. 2. FIG. 5 is a cross-sectional view conceptually taken along line 5—5 of FIG. 2, but is not a view of the back plate 28 shown in FIG. 2. FIG. 5 actually shows a modified back plate designed to accommodate a one and one-half inch male or externally threaded NPT fitting, rather than a two inch male or externally threaded NPT fitting that the back plate of FIG. 2 is designed to accommodate.

Back plate 28 includes a body 42 which as shown in FIG. 2 has a generally square outline. At each of the four corners of body 42, a cylindrical boss 46 projects from body top surface 44. From body surface 48 (See FIG. 3) opposite surface 44, stand-offs 50 project at each of the corners of body 42 and include radially aligned side faces 51 (See FIG. 4). Other stand-off shapes and quantities may be provided. The open space between adjacent stand-offs 50 and below body surface 48 form passageways 54 (See FIG. 6). The four passageways 54 around the periphery of back plate 28 provide a path for fluid to flow or drain from a tank when assembly 20 is installed as described below.

Figure 6:
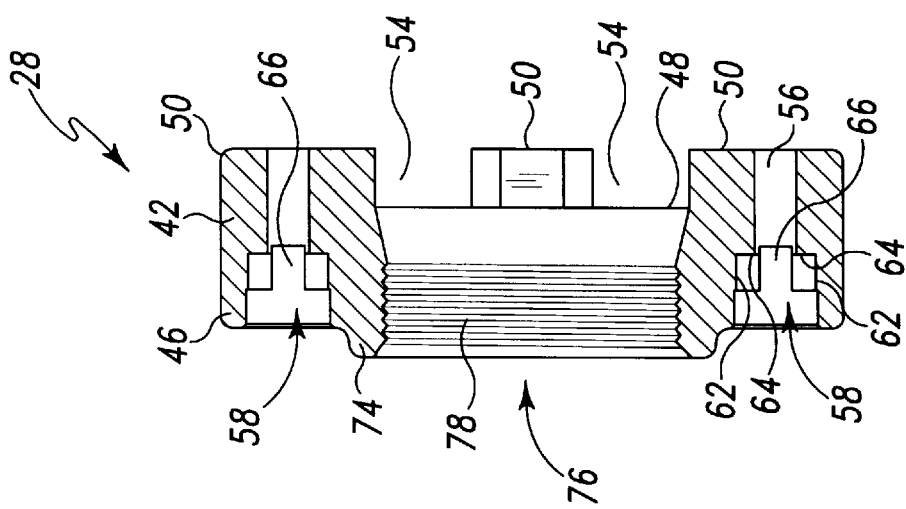
FIG. 6 is a cross sectional view, taken along line 6—6 of FIG. 2, of the back plate.

At each corner of body 42, a bore 56 extends through a boss 46, body 42 and a stand-off 50. Each of the four bosses, as well as its bolt/plug accommodating internal cavity described further below, is identical to the others. Therefore, the following description of the boss and cavity configuration has equal application to all the bosses and their corresponding cavities. With reference now to FIGS. 2 and 6, a counter sunk, cylindrical axial bore or cavity 58 is molded into boss 46. Along the inboard end of cavity 58, the surface that defines cavity 58 includes a pair of mirror-image, radially inwardly projecting ribs, generally designated 60. Ribs 60 each include a keyed region 62 and a ledge portion 64. As at both its ends each rib 60 is angularly spaced from the other rib along the circumference of cavity 58, a pair of diametrically opposed hollows 66 are formed between ribs 60 along the surface that defines cavity 58.

When bolt 26 is inserted into cavity 58, it may be inserted until the underside surface 68 of bolt head 70 abuts ledge portions 64 of ribs 60. Keyed regions 62 of ribs 60 are sized and configured to closely conform to the hexagonal periphery of bolt head 70, and engage bolt head 70 so as to prevent rotation of bolt 26 during tightening of nut 38. Hollows 66 are sized to receive axially extending legs of bolt plug 22 described further below.

An annular collar 74 centrally located within body 42 projects from surface 44. Ribs 75 project from body surface 44 and extend between bosses 46 and collar 74. Opening 76 extends through annular collar 74 and body 42 to provide a passage completely through the thickness of back plate 28. Internal threads 78 lining opening 76 along collar 74 and body 42 are provided to threadedly accommodate known attachments (not shown) for back plate 28. For example, one known attachment may be an anti-vortex fitting which projects above collar 74 in the form of orthogonally configured plates that would appear as an "X" in FIG. 2 and which prevents undesired fluid swirling during draining. Internal threads 78 also allow for the attachment of a sparger tube which may be used to enhance mixing of fluids inserted into a tank on which assembly 20 is installed. In alternate embodiments, internal threads 78 may be replaced with different types of attachment receiving modules, or eliminated entirely. In addition, if passageways 54 provide suitable drainage characteristics, opening 76 may be eliminated. Drain opening 76 naturally could be otherwise shaped within the scope of the invention.

Referring now to FIGS. 7–9, plug 22 is formed in one piece and includes a cylindrical body 82 with a circumferential groove 84. O-ring 24 fits into groove 84 and radially protrudes beyond body 82 to sealingly contact the interior surface of boss 46 that defines cavity 58. A beveled lip 86 on body 82 closely fits into the chamfered cavity mouth of boss 46. Jutting from the underside of body 82 are two, diametrically opposed retaining clips 90. Each clip 90 includes a leg 92 and a radially inwardly projecting locking tab or finger 94. Although formed to be rigid, clips 90 may be resiliently formed to snap fit over the bolt heads. The space 96 between clips 90 is sized and configured to receive bolt head 70. When bolt head 70 is inserted such as from the top in FIG. 7, one of the six flat faces of the hexagonal bolt head 70 rests substantially flush against each of legs 92, and locking tabs 94, by engagement with the bolt head underside surface 68, prevent axial removal (to the right in FIG. 7) of bolt head 70 from space 96. In FIG. 9, plug 22 is shown mounted on a bolt 26 partially shown in dashed lines. It will be appreciated that plug 22 may be utilized with back plate fitting portions different from the type of back plate fitting portion shown herein that allows fluid to drain through a passageway formed between the installed body plate and the tank wall. Furthermore, rather than clips 90, differently shaped retaining member(s) may be used to attach plug 22 to bolt 26. In addition, a sealing plug achieved in the shown embodiment by the assembly of plug 22 and O-ring 24 may be proved in a one-piece construction. Still further, other ways of sealing the bolt head may be provided. For example, rather than attaching to the bolts, plugs 22 provided with O-rings 24 could be externally threaded and mate with female threads provided in the boss cavity.

Figure 10:
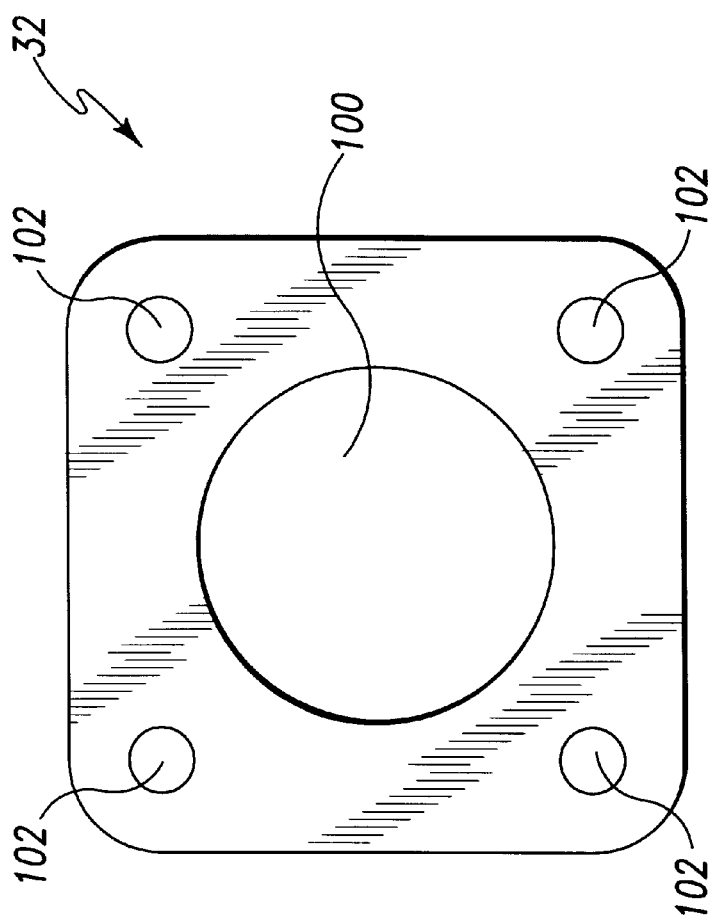
FIG. 10 is an end view of the flange gasket of FIG. 1.

Referring now to FIG. 10, apertured flange gasket 32 includes a central opening 100 and four smaller openings 102. Central opening 100 is sized similar to the opening through tank flange 34, and openings 102 are sized and positioned to insertably receive bolts 26 during assembly.

Figure 11:
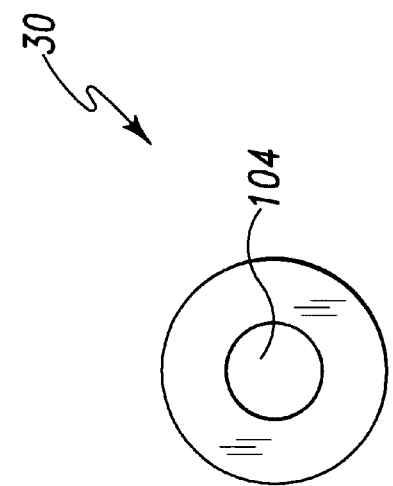
FIG. 11 is an end view of the bottom drain gasket of FIG. 1.

In FIG. 11, one annular drain gasket representative of each of drain gaskets 30 is shown. The central opening 104 is sized to insertably receive a bolt 26 during assembly. Separate drain gaskets 30 may be attached, such as with an adhesive, to the undersides of each of stand-offs 50 after aligning hole 104 of gasket 30 concentrically with hole 56 of stand-off 50 to facilitate assembly. In alternate embodiments, gaskets 30 may be press fit into counterbores provided in the bottom surfaces of the stand-offs, and such counterbores will be smaller in diameter than gaskets 30 and will have a lesser depth than the compressed thickness of gaskets 30.

Figure 12:
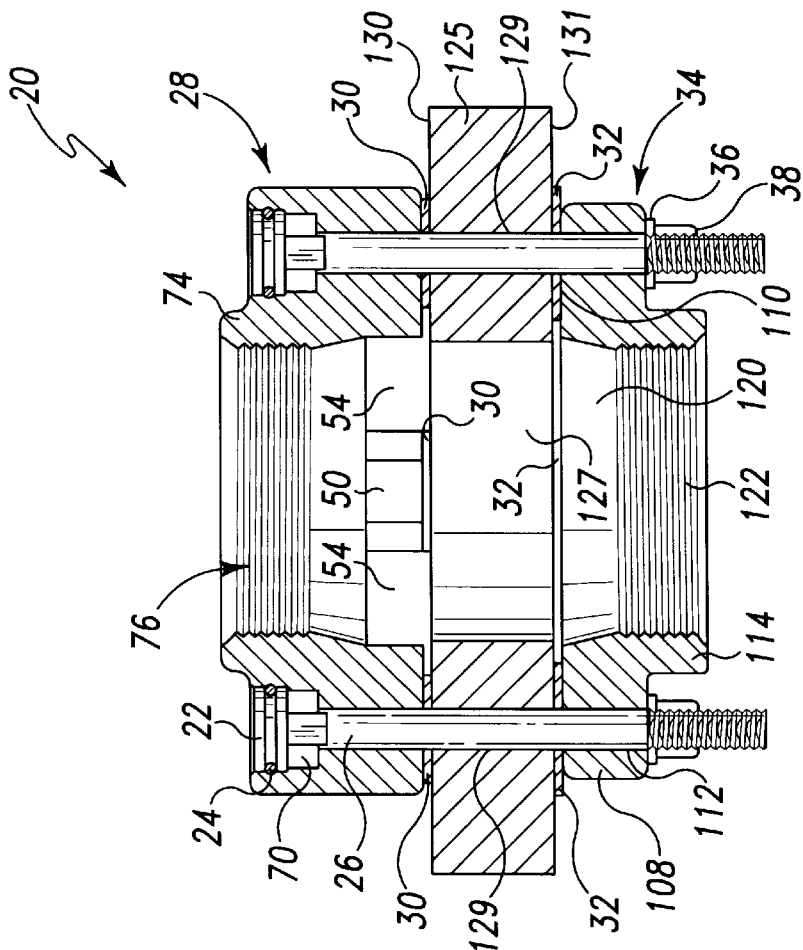
FIG. 12 is a cross-sectional view showing the tank fitting assembly of FIG. 1 as taken on line 6—6 of FIG. 2 operationally installed on a partially shown, apertured tank wall.
Figure 4:
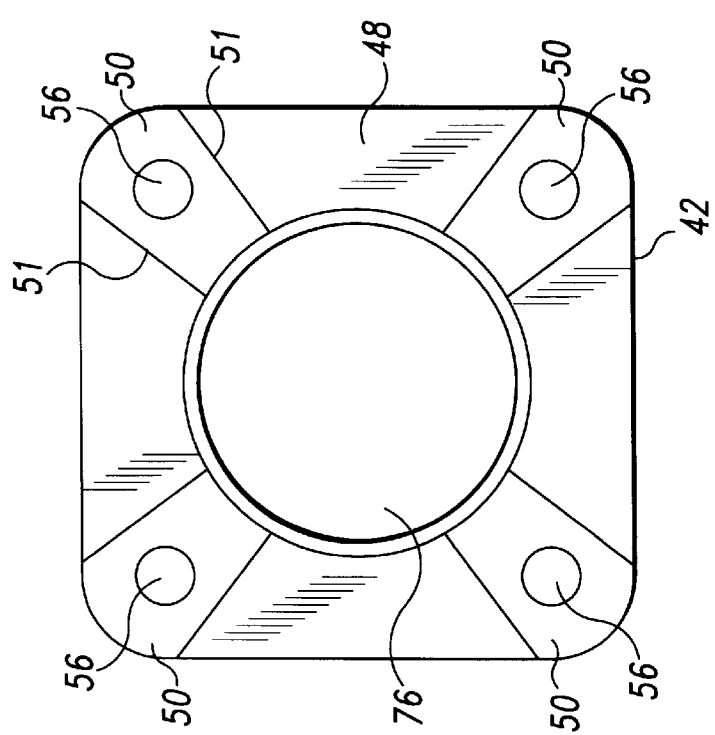
FIG. 4 is a right end view, taken from the perspective of a FIG. 1 viewer, of the back plate of FIG. 2.

As shown in FIGS. 1 and 12, externally mountable tank flange 34 includes a square, base flange 108 with a planar tank-facing surface 110 designed to be sealingly engaged by flange gasket 32. Tank flange 34 includes four bores 112 through which bolts 26 may be inserted. Collar portion 114 projects from base flange 108. Drain hole 120 extends through base flange 108 and collar portion 114. Internal threads 122 lining drain hole 120 allow attachments, such as a cap or valve fitting, to be attached to tank flange 34. The shown and described configuration of tank flange 34, including the manner in which attachments may be mounted to a base portion attached onto the tank, is merely illustrative and not intended to be limiting. Different base shapes, including those with integral fittings and the like, for example a male pipe thread, a hose barb, and a male coupling adaptor, may be provided within the scope of the invention. In addition, while the flange shape of tank flange 34 as well as back plate 28 accounts for assembly 20 being considered a tank flange fitting assembly, other shapes of these members may be provided within the scope of the invention, and the assembly resulting from such component parts is generally recognized as a tank fitting or tank fitting assembly.

The structure of tank flange fitting assembly 20 will be further understood in view of the following explanation of its installation and operation. FIG. 12 shows assembly 20 in cross-section after its installation on a tank wall 125 provided with a drain opening 127 and bolt bores 129. To install assembly 20 on a tank when its component parts are initially arranged as shown in FIG. 1, bolts 26 are equipped with plugs 22 fit with O-rings 24 by inserting the bolt heads 70 within the spaces 96 between retaining clips 90. One bolt 26 is then inserted into its corresponding cavity 58 and through bore 56 and central opening 104 of drain gasket 30 until bolt head surface 68 abuts ledge portions 64. During this insertion, an assembler may need to rotate bolt 26 such that the retaining clips 90 on plug 22 are aligned with hollows 66 to allow the insertion of both legs 92 into hollows 66. During this bolt insertion, plug 22 enters cavity 58 and O-ring 24 contacts and forms a fluid tight seal with the interior surface of bore 58 that defines the outboard portion of cavity 58. The sealing engagement by O-ring 24 with the boss surface also provides a frictional force which inhibits the axial removal of bolt 26.

With directions taken with reference to FIG. 12, back plate 28 with the now installed, plugged bolts 26 is then inserted from above tank wall 125 such that the threaded shanks of bolts 26 insert into and extend through wall bores 129. Flange gasket 32 is then inserted from below such that the portions of the bolts protruding from tank wall 125 insert through openings 102 and gasket central opening 100 is aligned with drain opening 127. Then, tank flange 34 is inserted from below such that bolts 26 insert into and through the bores 112 provided in base flange 108. Each bolt 26 is then provided with a lock washer 36 and a hex nut 38. By tightening hex nuts onto bolt 26, back plate 28 is drawn downwardly and tank flange 34 is drawn upwardly toward tank wall 125 as shown in FIG. 12. During this tightening process, drain gaskets 30 are compressed or sandwiched between stand-offs 50 and the top surface 130 of tank wall 125, and flange gasket 32 is sandwiched between bottom wall surface 131 and base flange surface 110. When so compressed, drain gaskets 30 provide fluid tight seals around bolts 26 and prevent the contents of the tank from reaching bolts 26 and bores 56 and 129. The sandwiching of flange gasket 32 provides a fluid tight seal circumferentially around drain opening 127 and flange hole 120 to prevent fluid leakage between tank wall 125 and base flange 108. After tank flange 34 is provided with an appropriate fitting (not shown), fluid can be filled into the tank equipped with tank flange fitting assembly 20. To drain fluid from the tank, the fitting on tank flange 34 is removed or opened, and fluid can initially drain through opening 76 and passageways 54, through wall opening 127, and through hole 120. When fluid within the tank has drained to such a level as to be below the height of collar 74, fluid can still drain through passageways 54 into drain opening 127 and then out through hole 120 of the base flange 108. It will be appreciated that provided drain opening 127 is located at the lowest portion of the tank, substantially all of the contents of that tank can be drained through drain opening 127 via the passageways 54.

Figure 13:
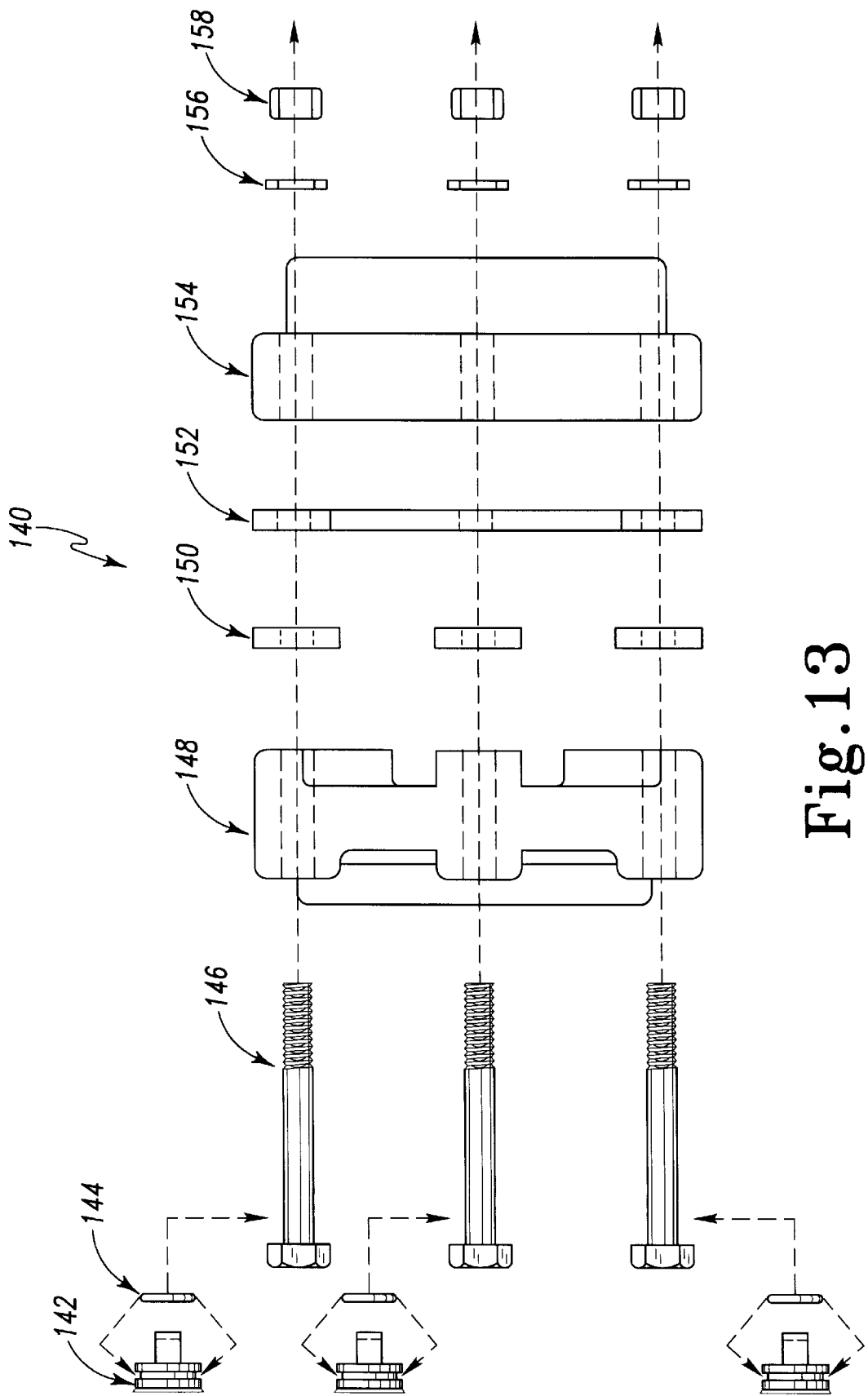
FIG. 13 is an exploded side view of a six sided polygon or generally hexagonal tank fitting assembly of the present invention.
Figure 14:
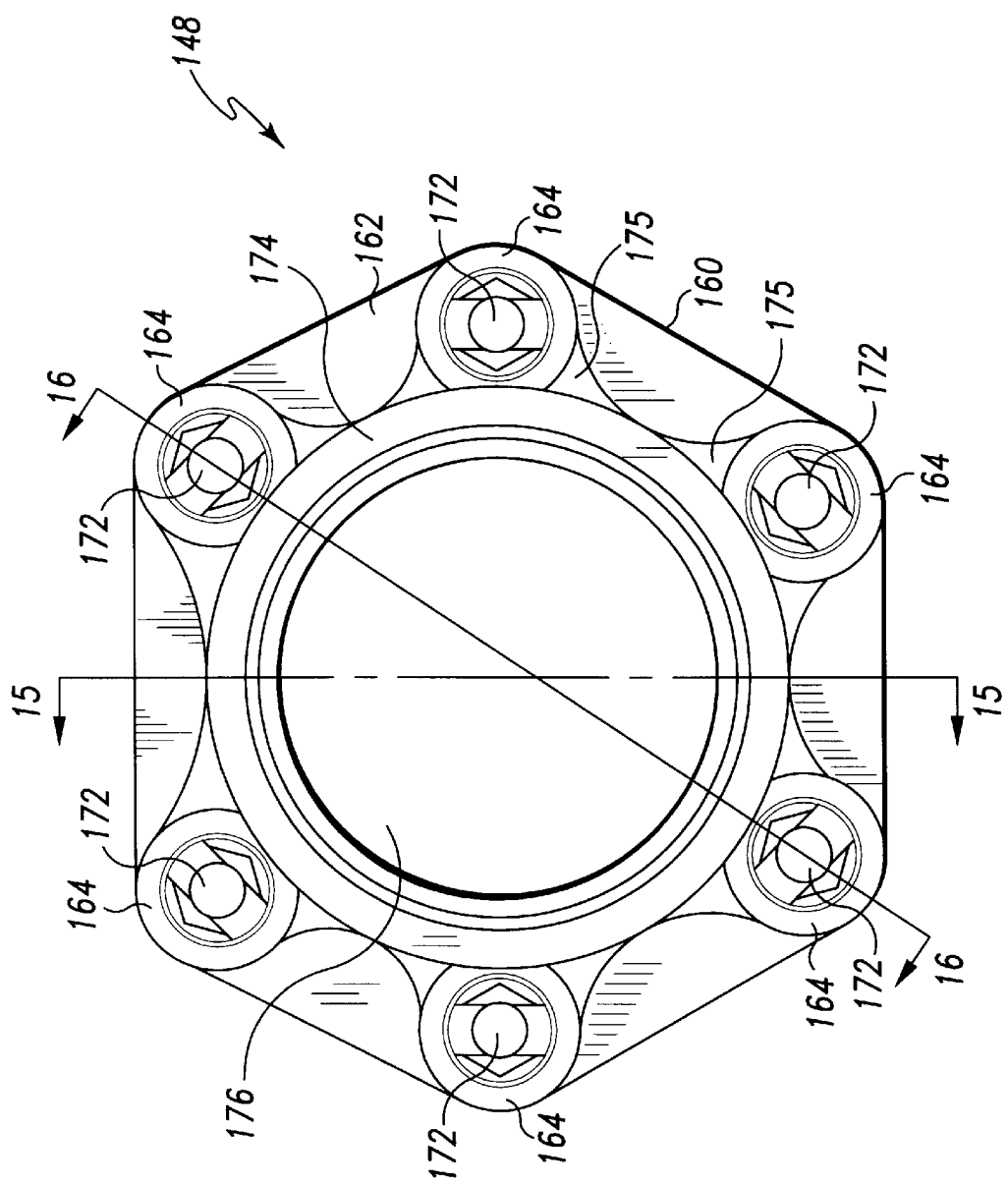
FIG. 14 is a left end view, taken from the perspective of a FIG. 13 viewer, of the back plate of the tank fitting assembly of FIG. 13.
Figure 16:
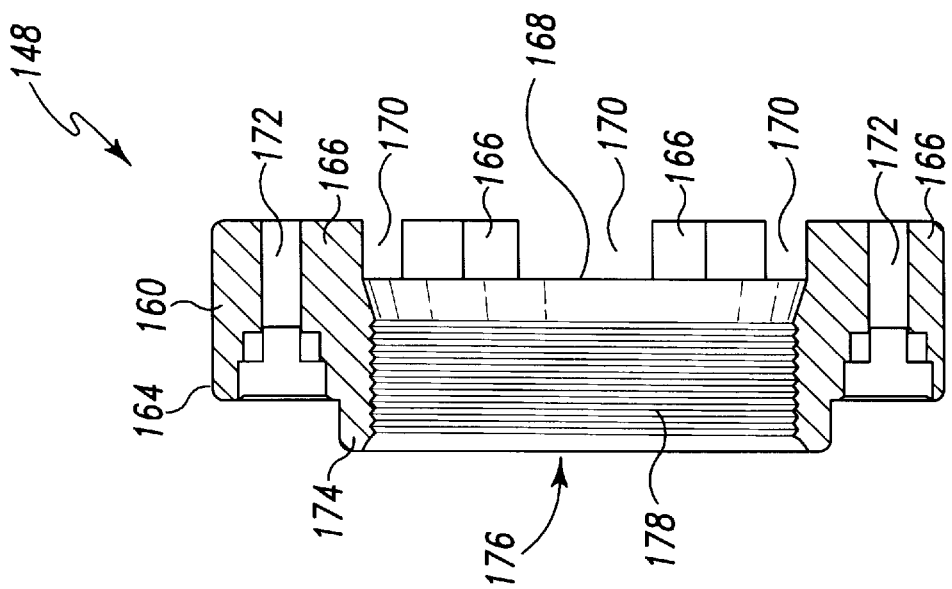
FIG. 16 is a cross-sectional view taken along line 16—16 of FIG. 14.
Figure 15:
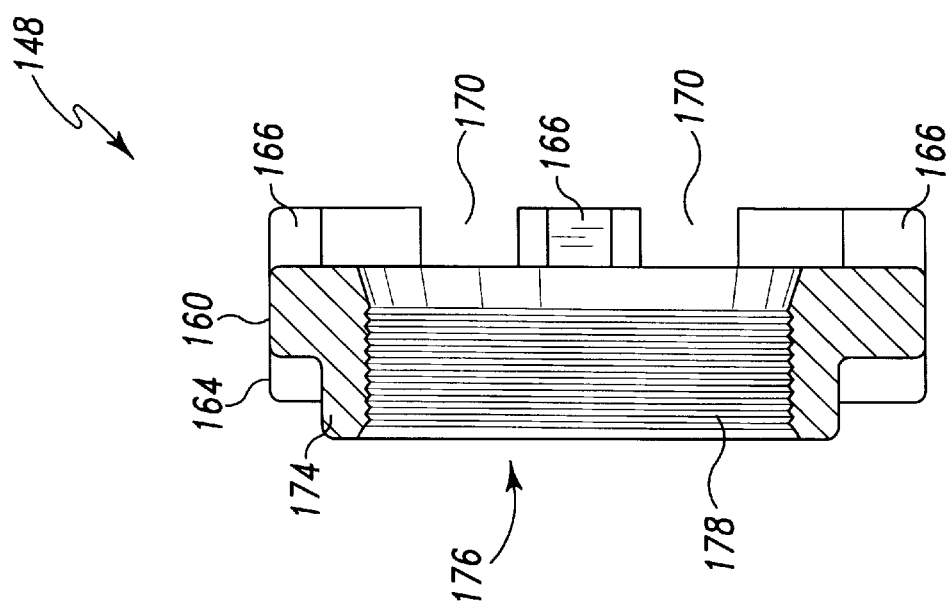
FIG. 15 is a cross-sectional view taken along line 15—15 of FIG. 14.
Figure 17:
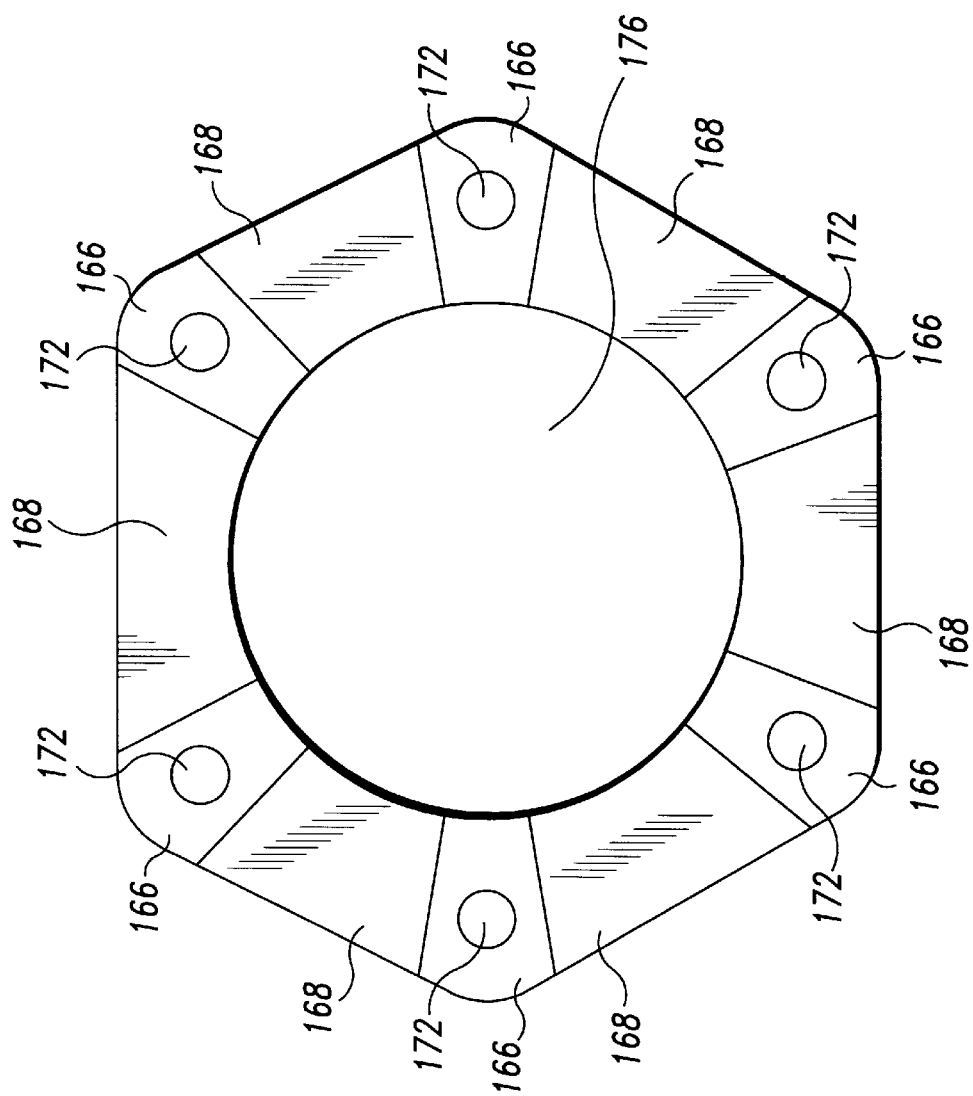
FIG. 17 is a right end view, taken from the perspective of a FIG. 13 viewer, of the back plate of FIG. 13.

Referring now to FIG. 13, there is shown a second embodiment of a tank fitting assembly of the present invention. This embodiment is generally designated 140 and includes six plugs 142 with O-rings 144, six bolts 146, a generally hexagonal back plate 148, six drain gaskets 150, one flange gasket 152, one tank flange 154, six lock washers 156 and six hex nuts 158. Assembly 140 is substantially similar to tank fitting assembly 20 in all respects except that it utilizes larger, generally hexagonal shaped components (See FIGS. 14–17 further showing back plate 148), and that instead of four bolts/plugs/nuts it is designed for use with six bolts/plugs/nuts, one proximate each of the intersections of its six sides. Corresponding changes to the overall shape and through holes in the tank flange 154 and flange gasket 152 are naturally provided. Therefore, the skilled artisan will fully comprehend the overall structure and operation of the tank flange fitting assembly 140 of FIGS. 13–18 in view of the above description of assembly 20.

To further show the generally hexagonal configuration, back plate 148 is shown in FIGS. 14–17 as including a generally hexagonal body 160 having a top surface 162 from which project six cylindrical bosses 164. Six stand-offs 166 project from the underside of body 160, and the open space between adjacent stand-offs 166 and below body bottom surface 168 form six passageways 170. Bores 172 extends through bosses 164, body 160 and stand-off 166, and bosses 164 are provided with cavities identical to the bosses of assembly 20 which accommodate plugs and bolts. Annular collar 174 projects from top surface 162. Ribs 175 project from top surface 162 and extend between bosses 164 and collar 174. Opening 176 extends through annular collar 174 and body 160 to provide a drain passage. Internal threads 178 lining opening 176 threadedly accommodate known attachments. Opening 176 and threads 178 provide a three inch NPT female pipe thread.

Figure 18:
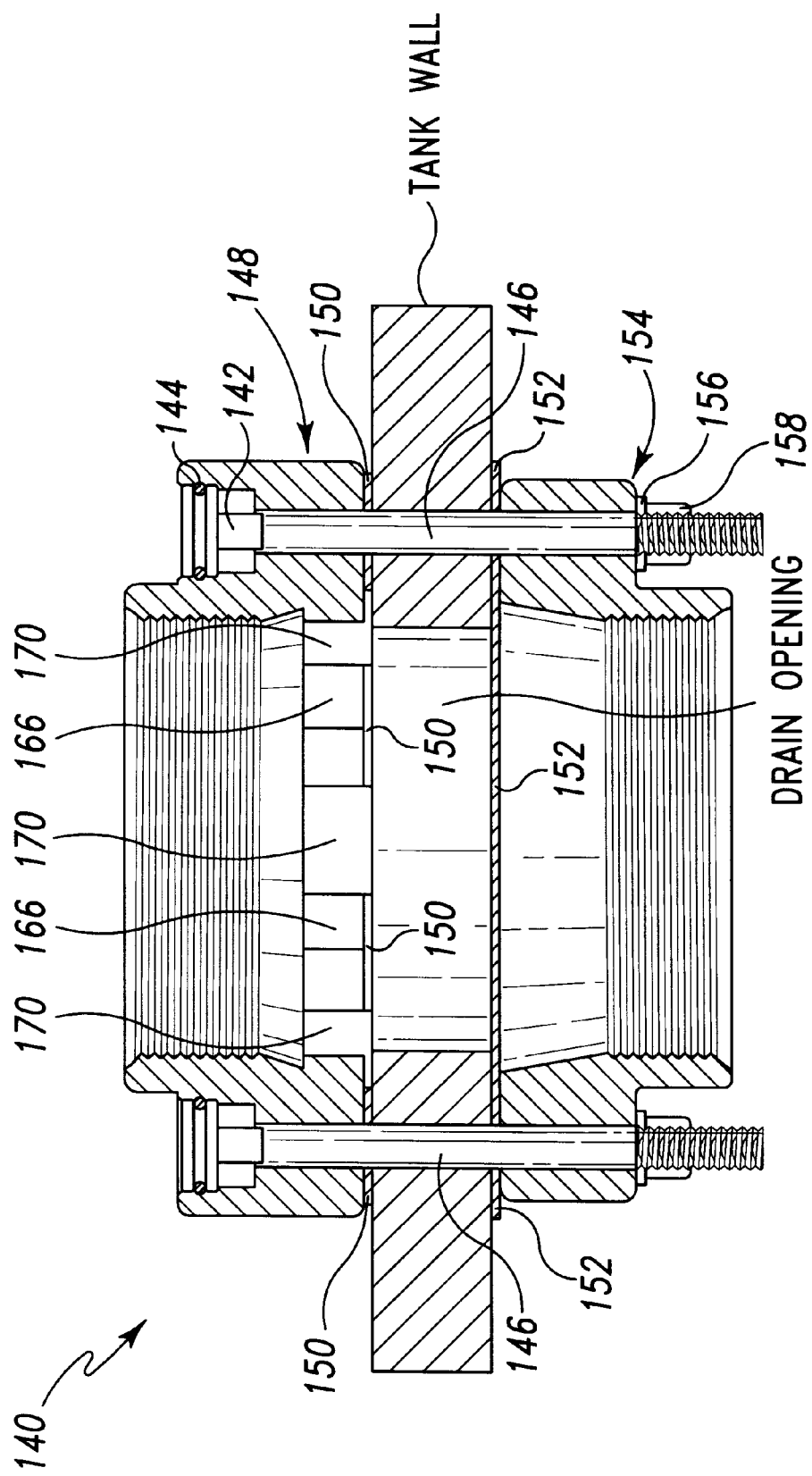
FIG. 18 is a cross-sectional view showing the hexagonal tank fitting assembly of FIG. 13 operationally installed on a partially shown, apertured tank wall.

Assembly 140 is installed on a tank in a similar fashion as assembly 20, but may be used with a larger tank wall drain opening as shown in FIG. 18.

While this invention has been shown and described as having multiple designs, the present invention may be further modified within the spirit and scope of this disclosure. For example, the back plate and tank flange may be attached with connectors or fasteners other than the shown bolts/nuts, for example with threaded studs or with bolts that engage threaded bores. This application is therefore intended to cover any variations, uses, or adaptations of the invention using its general principles. Further, this application is intended to cover such departures from the present disclosure as come within known or customary practice in the art to which this invention pertains.

What is claimed is:

1. A tank fitting assembly for a tank including a drain opening in a bottom wall, comprising:
    a first fitting element mountable to an interior surface of the tank bottom wall in registry with the drain opening, said first fitting element comprising a first bottom surface portion and a second bottom surface portion, said second bottom surface portion being upwardly offset from said first bottom surface portion, said second bottom surface portion structured and arranged to be in a direct facing and spaced apart relationship with the tank bottom wall, whereby said second bottom surface portion defines with the tank bottom wall at least one fluid passageway for fluid to pass along the bottom wall of the tank between a location lateral to the first fitting element and the tank wall drain opening;
    a second fitting element mountable to an exterior surface of the tank bottom wall in registry with the drain opening, said second fitting element comprising a drain hole adapted to provide flow communication between the tank wall drain opening and a location external to the tank; and
    a plurality of connectors extendable through the tank bottom wall for interconnecting said first and second fitting elements.

2. The tank fitting assembly of claim 1 wherein said first fitting element comprises a body including a bottom surface, and a plurality of stand-offs projecting down from said body bottom surface, wherein said body bottom surface comprises said second bottom surface portion, wherein bottom surfaces of said plurality of stand-offs comprise said first bottom surface portion, and wherein said at least one fluid passageway is disposed between said plurality of stand-offs.

3. The tank fitting assembly of claim 2 wherein said body is square, wherein said plurality of stand-offs comprise four stand-offs, wherein one of said four stand-offs is disposed proximate each corner of said square body, and wherein said at least one fluid passageway comprises four passageways, each one of said four passageways being located between stand-offs disposed proximate adjacent corners of said square body.

4. The tank fitting assembly of claim 2 wherein said body comprises a back plate with an internally threaded opening positioned to be situated above the tank wall drain opening.

5. The tank fitting assembly of claim 2 further comprising a plurality of sealing members, each of said sealing members for providing a fluid-tight seal between the bottom surface of one stand-off and the tank wall, and wherein one of said plurality of connectors spanning said first and second fitting elements extends from the bottom surface of each of said stand-offs and is ringed by one of said plurality of sealing members.

6. The tank fitting assembly of claim 2 wherein said first fitting element comprises a plurality of bosses projecting from a top surface of said body above said stand-offs, an annular collar projecting from said body top surface, an opening extending through said collar and body at a position directly above the tank wall drain opening, and a plurality of connector receiving bores, each of said connector receiving bores extending through one of said bosses, said body, and one of said stand-offs.

7. The tank fitting assembly of claim 2 wherein said first fitting element comprises a plurality of bores and a plurality of cavities for said plurality of connectors, wherein each of said plurality of bores includes an upper end portion that opens into a different one of said plurality of cavities, said plurality of bores disposed in a first arrangement, wherein one of said plurality of bores extends within each of said plurality of stand-offs, wherein said second fitting element comprise a plurality of bores disposed in said first arrangement, wherein each of said plurality of connectors comprises an enlarged head and a shaft extending from said head, each of said connector heads structured to fit within one of said plurality of cavities and to not fit within the upper end portion of the bore of said first fitting element associated with said one cavity, each of said shafts extending within one of said plurality of bores of said first fitting element and one of said plurality of bores of said second fitting element, and a plurality of plugs, each one of said plugs disposed within one of said plurality of cavities, said plugs adapted to provide fluid tight seals with said first fitting element to prevent fluid in the tank from reaching said connector heads within said plurality of cavities.

8. The tank fitting assembly of claim 7 wherein each of said plurality of plugs comprises a main body section for sealingly engaging said first fitting element, and first and second retaining clips each comprising a leg extending downward from said main body section and a locking tab inwardly projecting from said leg, said legs of said first and second retaining clips being spaced to accommodate a connector head positioned directly below said main body section while said connector shaft is pointed away from said main body section, said locking tabs of said first and second retaining clips being spaced from said main body section to accommodate said connector head between said main body section and said locking tabs while said connector shaft is pointed away from said main body section, said locking tabs of said first and second retaining clips each extending inward a sufficient distance to be located below an underside surface of the connector head positioned directly below said main body section.

9. A tank fitting assembly for a tank including a wall defining a fluid fillable internal volume, wherein a section of the wall defining a region of the internal volume includes a drain opening and at least one connector accommodating opening spaced from the drain opening, comprising:

a first fitting element internally mountable to the tank in registry with the tank wall drain opening, said first fitting element comprising a bottom surface facing toward the wall section and a top surface facing away from the wall section, said first fitting element structured and arranged to form a fluid passageway for flow communication between the tank wall drain opening and the tank internal volume, said first fitting element comprising a plurality of bores and a plurality of cavities separate from said fluid passageway, wherein each of said plurality of bores includes an upper end portion that opens into a different one of said plurality of cavities, said plurality of bores disposed in a first arrangement;

a second fitting element externally mountable to the tank in registry with the tank wall drain opening, said second fitting element comprising a drain hole adapted to provide flow communication between the tank wall drain opening and a location exterior to the tank, said second fitting element comprising a plurality of bores disposed in said first arrangement;

a plurality of connectors insertable through the at least one connector accommodating opening of the tank wall for interconnecting said first and second fitting elements, each of said plurality of connectors comprising an enlarged head and a shaft extending from said head, each of said connector heads structured to fit within one of said plurality of cavities and to not fit within the upper end portion of the bore of said first fitting element associated with said one cavity, each of said shafts extending within one of said plurality of bores of said first fitting element and one of said plurality of bores of said second fitting element; and a plurality of plugs, each one of said plugs disposed within one of said plurality of cavities above the connector head within said cavity, said plugs adapted to provide fluid tight seals with said first fitting element to prevent fluid in the tank from reaching said connector heads.

10. The tank fitting assembly of claim 9 wherein each of said plurality of plugs comprises a main body section for sealingly engaging said first fitting element, and at least one retaining clip downwardly projecting from said main body section, said retaining clip structured and arranged for engagement with an underside surface of the connector head within the cavity.

11. The tank fitting assembly of claim 10 wherein said main body section of each of said plugs comprises a cylindrical body including a circumferential groove, and an elastic O-ring seated within said groove for sealing against said first fitting element.

12. The tank fitting assembly of claim 10 wherein said at least one retaining clip comprises a first retaining clip and a second retaining clip, each of said first and second retaining clips comprising a leg extending downward from said main body section and a locking tab inwardly projecting from said leg, said legs of said first and second retaining clips being spaced to accommodate a connector head positioned directly below said main body section while said connector shaft is pointed away from said main body section, said locking tabs of said first and second retaining clips being spaced from said main body section to accommodate said connector head between said main body section and said locking tabs while said connector shaft is pointed away from said main body section, said locking tabs of said first and second retaining clips each extending inward a sufficient distance to be located below the underside surface of the connector head positioned directly below said main body section.

13. The tank fitting assembly of claim 12 wherein said main body section is cylindrical, and wherein said first and second retaining clips are diametrically positioned on said main body section.

14. The tank fitting assembly of claim 12 wherein said first fitting element comprises first and second facing ribs projecting radially inward from a surface defining at least one of said plurality of cavities, each of said first and second ribs comprising a keyed region and a ledge portion below said keyed region within said cavity, said ledge portions adapted to be abutted by the underside surface of the connector head, said keyed regions designed complementarily to a peripheral shape of said connector head such that said connector head is rotationally fixed when nested with said keyed regions, said first and second ribs being angularly spaced to define a pair of diametrically opposed hollows sized to receive said first and second retaining clips.

15. The tank fitting assembly of claim 9 wherein a surface of said first fitting element defining each of said plurality of cavities is sized and shaped complementary to a peripheral shape of said connector head within said cavity, whereby said connector head is rotationally fixed when nested with said cavity defining surface.

16. The tank fitting assembly of claim 9 wherein said plurality of connectors comprises bolts and nuts threadedly attachable to the shafts of said bolts.

17. A method of providing a fitting on a tank having a wall including a drain opening and at least one connector accommodating opening, comprising the steps of:

positioning a first fitting element on an inside surface of the tank in registry with the tank wall drain opening, said first fitting element having a fluid passageway to permit flow communication between the tank wall drain opening and the tank internal volume, said first fitting element comprising a plurality of bores and a plurality of cavities separate from said fluid passageway, wherein each of said plurality of bores includes an end portion that opens into a different one of said plurality of cavities, said plurality of bores disposed in a first arrangement;

positioning a second fitting element on an outside surface of the tank in registry with the tank wall drain opening, said second fitting element comprising a drain hole adapted to provide flow communication between the tank wall drain opening and a location exterior to the tank, said second fitting element comprising a plurality of bores disposed in said first arrangement;

connecting the first and second fitting elements with a plurality of bolts and nuts by first installing each bolt such that its head resides within one cavity of said plurality of cavities and its shaft extends through the bore of said first fitting element associated with the one cavity, the at least one connector accommodating opening, and one bore of said plurality of bores of said second fitting element, and then threading each nut onto the insertion end of its corresponding bolt; and installing a plurality of plugs within said plurality of cavities above the bolt heads within said cavities, wherein said plugs are adapted to provide fluid tight seals with said first fitting element to prevent fluid in the tank from reaching said bolt heads.

18. The method of claim 17 further comprising the step of detachably mounting one of said plurality of plugs on said head of one bolt prior to the step of installing such bolt such that its head resides within the cavity.

19. The method of claim 18 wherein said plug to be detachably mounted comprises a main body section for sealingly engaging said first fitting element, and first and second retaining clips each comprising a leg extending downward from said main body section and a locking tab inwardly projecting from said leg, said legs of said first and second retaining clips being spaced to accommodate the bolt head positioned directly below said main body section, said locking tabs of said first and second retaining clips being spaced from said main body section to accommodate said bolt head between said main body section and said locking tabs, said locking tabs of said first and second retaining clips each extending inward a sufficient distance to be located below the underside surface of the bolt head positioned directly below said main body section.

20. The method of claim 17 further comprising the step of providing said first fitting element with stand-off portions such that the fluid passageway is formed between an underside surface of said first fitting element and the tank wall.

* * * * *